H. A. MANLEY.
Egg-Boiler.

No. 211,859.    Patented Feb. 4, 1879.

Witnesses:
W. J. Cambridge
George Baker

Inventor:
Horace A. Manley
per I. E. Teschemacher
Atty

UNITED STATES PATENT OFFICE.

HORACE A. MANLEY, OF BOSTON, MASSACHUSETTS.

IMPROVEMENT IN EGG-BOILERS.

Specification forming part of Letters Patent No. 211,859, dated February 4, 1879; application filed December 20, 1878.

*To all whom it may concern:*

Be it known that I, HORACE A. MANLEY, of Boston, in the county of Suffolk and State of Massachusetts, have invented certain Improvements in Egg-Boilers, of which the following is a full, clear, and exact description, reference being had to the accompanying drawings, making part of this specification, in which—

Figure 1:
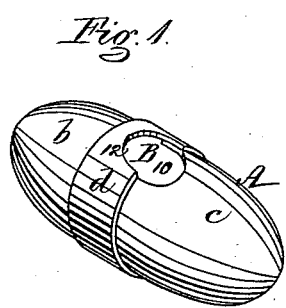
Figure 2:
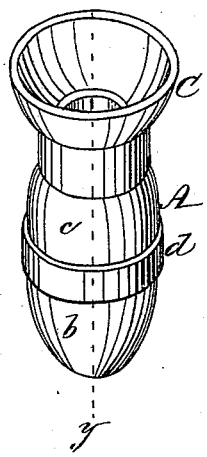
Figure 3:
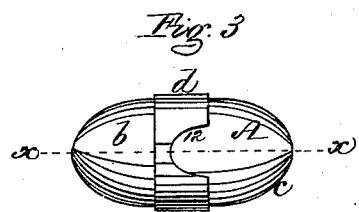
Figure 5:
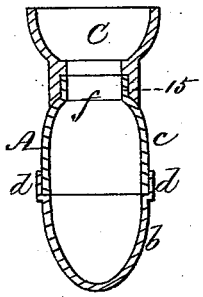
Figure 4:
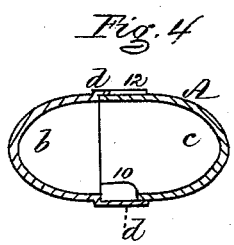
Figure 6:
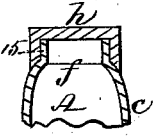

Figures 1 and 2 are perspective views of egg-boilers constructed in accordance with my invention. Fig. 3 is a side elevation of the egg-boiler shown in Fig. 1, the aperture through which the egg is introduced being closed. Fig. 4 is a longitudinal central section on the line $x\ x$ of Fig. 3. Fig. 5 is a longitudinal central section on the line $y\ y$ of Fig. 2; Fig. 6, detail in section.

The ordinary method of boiling and serving eggs in the shell is objectionable for several reasons—viz., the egg is often too hot to handle on the table, and there is also a liability of its being found to be unsound or addled when broken. Moreover, the egg-shell is often cracked in the boiling, allowing its contents to exude, and thus giving it an unsightly appearance on the table, and, furthermore, pieces of the shell often get mixed with the edible portion and are taken with it into the mouth.

My invention has for its object to remove all of the above-mentioned difficulties, and enable an egg to be boiled without the shell in such a manner that it will, if sufficiently cooked, retain its original shape; and my invention consists in a receptacle made in the form of and about the size of an egg, and divided centrally, or nearly so, into two halves or portions, which are adapted to fit snugly together, an opening (capable of being closed by a cap or otherwise) being provided, through which the egg is introduced when removed from its shell, the egg being boiled in this receptacle, which serves as an artificial shell, from which it may be taken, and, if sufficiently hard, placed in a cup; or, if a soft-boiled egg is desired, the receptacle may be brought to the table, and subsequently opened when the egg is to be eaten.

To enable others skilled in the art to understand and use my invention, I will proceed to describe the manner in which I have carried it out.

In the said drawings, A represents a receptacle of ellipsoidal form, composed of two halves or portions, $b\ c$, and of about the size of an egg, being made of sheet metal struck up in dies, or of china, glass, or other suitable material, capable of withstanding the action of boiling water.

To the outside of the portion $b$ is permanently secured a band or collar, $d$, which projects beyond its edge, and within this collar snugly fits the other portion, $c$, the friction being sufficient to hold the two portions firmly together, but yet admit of their being readily separated when required, and when the two portions are thus fitted together a tight joint will be formed between them, and their edges will lie perfectly flush with each other on the inside of the joint.

The edge of the portion $c$, Fig. 1, is provided with a U-shaped notch, 10, and the band $d$ is also provided with a similar notch, 12. These notches, when opposite each other and the portions $b\ c$, are fitted together, forming an aperture, B, through which an egg, after being divested of its shell, can be introduced, a funnel being used to facilitate this operation, and the two portions $b\ c$ being preferably drawn apart as far as practicable, as seen in Fig. 1, to enlarge the aperture B.

The two parts of the receptacle are then forced together, so as to close the joint between their edges, and if the receptacle is not of sufficient size to contain the whole of an egg, the surplus will overflow and run out at the aperture B when the two parts are pushed together.

The two portions $b\ c$ are now turned in opposite directions, so as to carry the two notches 10 12 away from each other, which causes the aperture B to be tightly closed, when the receptacle is dropped into a kettle or pot of boiling water and allowed to remain until the contents are cooked to suit the taste.

The receptacle A thus forms an artificial shell, by which the egg is retained in its natural shape while being boiled, and if sufficiently cooked it can be taken out of the receptacle without losing its natural shape, and placed in an egg-cup and served hot on the table.

If, however, a soft-boiled egg is desired the receptacle may be brought onto the table and opened by drawing the two portions $b\,c$ apart, which affords access to the interior, when the contents can be poured out or removed with a spoon in the same manner as from an egg-shell.

In the receptacle shown in Figs. 2 and 5 the aperture $f$ for the admission of the egg is located at the outer end of the portion $c$, and is surrounded by a neck or flange, 15, over which a removable funnel, C, can be fitted, through which the egg divested of its shell can be poured into the receptacle, after which the funnel is removed and a tightly-fitting cap, $h$, applied to the neck, as seen in Fig. 6, when the receptacle is ready to be placed in the boiling water.

If desired, the funnel C can be permanently attached to the portion $c$, in which case a tightly-fitting slide or other suitable device would be employed in place of the cap $h$ for closing the aperture $f$.

When a number of the receptacles shown in Fig. 2 are to be filled, as in a hotel or restaurant, they may be placed upright in a rack provided with holes to receive them, the encircling band $d$ forming a shoulder, which would rest upon the rack around the edges of the aperture and hold the receptacle in place. The band may also be made to serve a similar purpose when the receptacle A (shown in Figs. 1 or 2) is placed in a wire or other holder upon the table.

Instead of the receptacle being divided transversely, as shown, it may be divided longitudinally into two halves or portions, which may be hinged together, if desired, and these portions may be fluted or provided with ornamental figures, which will be reproduced upon the surface of the egg if sufficiently cooked when withdrawn from the receptacle.

If desired, the ends of the receptacle A may be provided with small air-apertures to facilitate the removal of the egg when cooked.

By the employment of the above-described egg-boiler, which can be constructed at a trifling cost, all liability of serving an egg upon the table in an unsound condition will be entirely avoided, while it can be made to retain its natural shape after being boiled, and present a clean and appetizing appearance. Furthermore, the receptacle A can be withdrawn from the boiling water and opened to inspect the egg, and closed and returned to the water if the egg is not sufficiently cooked.

What I claim as my invention, and desire to secure by Letters Patent, is—

1. An egg boiler or receptacle, A, for containing an egg divested of its shell, composed of two separate portions, $b\,c$, adapted to fit together, and provided with an aperture for the introduction of the egg, substantially as set forth.

2. The portion $c$, with its notch 10, in combination with the portion $b$ and the encircling band or collar $d$, with its notch 12, constructed to operate substantially in the manner and for the purpose described.

3. The combination of a funnel, C, with an egg boiler or receptacle, A, composed of two separate portions, $b\,c$, adapted to fit together, and provided with an aperture for the introduction of the egg divested of its shell, substantially as set forth.

Witness my hand this 16th day of December, A. D. 1878.

HORACE A. MANLEY.

In presence of—
P. E. TESCHEMACHER,
W. J. CAMBRIDGE.